(12) United States Patent
Einarsson et al.

(10) Patent No.: US 8,979,948 B2
(45) Date of Patent: Mar. 17, 2015

(54) PRODUCTION OF LOW SODIUM SALT WITH BALANCED MINERAL CONTENT

(75) Inventors: Egill Einarsson, Reykjavik (IS); Eidur Helgi Sigurjonsson, Reykjavik (IS)

(73) Assignee: Arctic Sea Minerals ehf., Reykjanesbaer (IS)

( * ) Notice: Subject to any disclaimer, the term of this patent is extended or adjusted under 35 U.S.C. 154(b) by 148 days.

(21) Appl. No.: 13/805,209

(22) PCT Filed: Jun. 20, 2011

(86) PCT No.: PCT/IS2011/050008
§ 371 (c)(1),
(2), (4) Date: Mar. 7, 2013

(87) PCT Pub. No.: WO2011/158260
PCT Pub. Date: Dec. 22, 2011

(65) Prior Publication Data
US 2013/0164424 A1    Jun. 27, 2013

(30) Foreign Application Priority Data
Jun. 18, 2010   (IS) ............................................. 8903

(51) Int. Cl.
*C01D 3/06* (2006.01)
*A23L 1/237* (2006.01)
*A23L 1/304* (2006.01)

(52) U.S. Cl.
CPC ................. *A23L 1/237* (2013.01); *A23L 1/304* (2013.01); *C01D 3/06* (2013.01)
USPC .......................................... 23/303; 23/302 R

(58) Field of Classification Search
USPC .......................... 23/303, 295 R, 302 R, 302 T
See application file for complete search history.

(56) References Cited

U.S. PATENT DOCUMENTS

| | | | |
|---|---|---|---|
| 3,155,458 | A | 11/1964 | Fiedelman et al. |
| 3,925,027 | A | 12/1975 | Fiedelman |
| 4,210,421 | A | 7/1980 | Dahms |
| 4,533,536 | A | 8/1985 | Bichara et al. |
| 7,621,968 | B1 | 11/2009 | Kirchner et al. |
| 2008/0220127 | A1 | 9/2008 | Zuniga |

FOREIGN PATENT DOCUMENTS

| | | |
|---|---|---|
| CN | 101066769 A | 11/2007 |
| EP | 0 458 403 A2 | 11/1991 |
| WO | 86/05954 A1 | 10/1986 |
| WO | 90/00522 A1 | 1/1990 |
| WO | 92/16117 A1 | 10/1992 |
| WO | 93/18668 A1 | 9/1993 |

*Primary Examiner* — Edward Johnson
(74) *Attorney, Agent, or Firm* — Seed IP Law Group PLLC

(57) ABSTRACT

A process is provided for preparing a salt product with reduced sodium content including the step of providing a concentrated brine, which is typically seawater, to which has been added potassium chloride. The mixture is transferred to a crystallizer unit where at least a portion of the mix is transferred to the crystallizer through a washing column. Liquid is evaporated from the crystallizer such that crystals form, crystals are passed from the crystallizer through said washing column to a separating unit such that in the passing through the washing column the crystals are rinsed with the brine portion being transferred as a counter current through the column. The inventive process is characterized by recycling of the brine from which the salt crystallizes, thus all main ingredients of the mixed input brine reach a steady equilibrium concentration in the mother liquor in the crystallizer. These will then precipitate as crystals, as more of the respective substances gets added to the mother liquor through inflow of mixed input brine. None of the liquor is purged out of the system as in conventional salt crystallizers. All the components in the feed are substantially contained in the product from the crystallizer either as crystalline material or soluble ingredients.

17 Claims, 1 Drawing Sheet

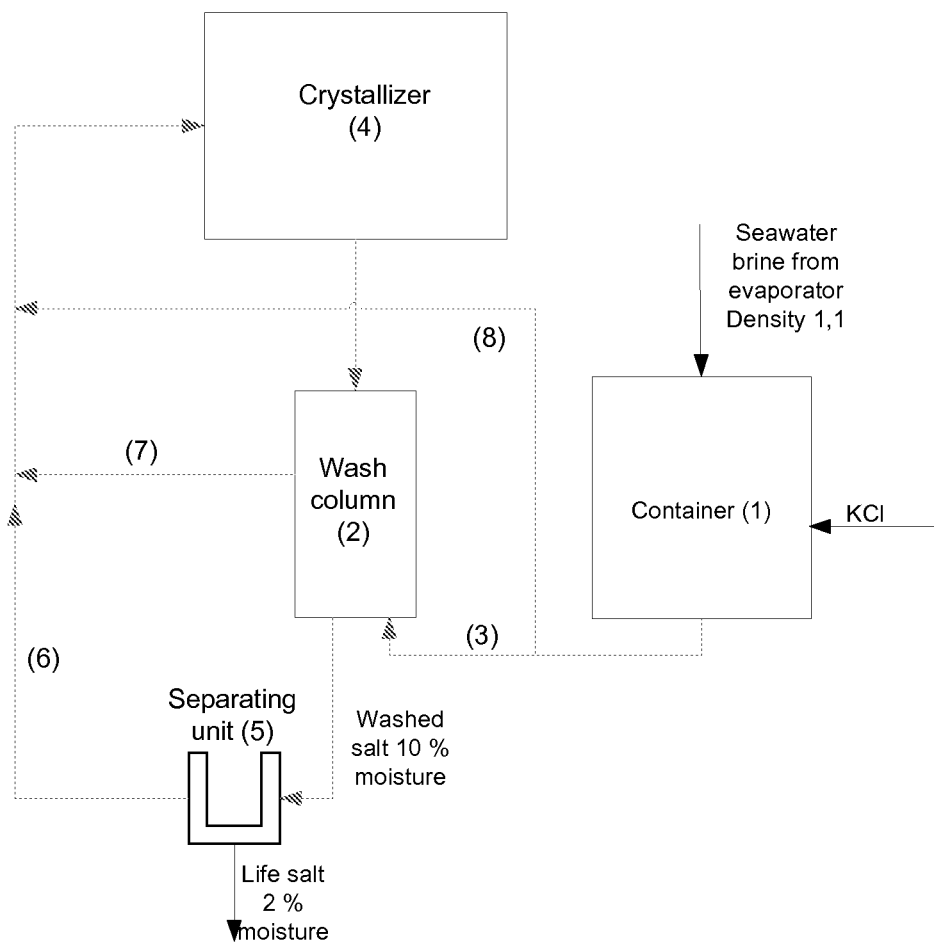

PRODUCTION OF LOW SODIUM SALT WITH BALANCED MINERAL CONTENT

TECHNICAL FIELD

The invention relates to the production of salt containing sodium chloride and other mineral components found in seawater, and preferably having a substantial content of potassium chloride. The invention includes a process with steps improving the organoleptic properties of the obtained salt, which can be provided having a low sodium content as compared to regular table salt, and provides beneficial trace mineral components.

BACKGROUND ART

Crystallisation of table salt is a traditional method for production of almost pure sodium chloride salt. Usually a brine is made from underground salt mines (solution mining) and evaporated to saturation of sodium chloride with subsequent crystallisation. Other minerals in the brine are purged out of the system. Because of increased emphasis on lower sodium diets, several methods have been developed for production of low sodium salts mostly by substituting sodium with potassium chloride and magnesium salts.

Salt consumption is generally considered too high, in the Western world in particular. Salt is used as preservative and taste enhancer, especially in processed food. A high salt intake (i.e. intake of sodium chloride) can increase risk of hypertension, circulation disorders and have other negative effects on health. Further, when excess salt is secreted this causes a burden on the kidneys and increased secretion of other essential minor trace mineral, which can lead to a lack of such minerals. Accordingly, a reduced consumption of salt is desirable.

WO 86/05954 describes a mineral salt composition produced by controlled evaporation of sea water, fractionated precipitation of sodium chloride and recovering the remaining dissolved mineral salts from the mother lye, e.g. by spray drying. The disclosure focuses on the importance of trace minerals but does not discuss how to prevent bitter taste of other components than sodium chloride.

In WO 90/00522 a method is disclosed for production of sodium reduced salt, wherein the sodium chloride is wholly or partly replaced by double salt of potassium compounds and magnesium compounds. The salt is obtained by evaporation of a solution of the salts to dry solids.

WO 92/16117 describes a method for producing a salt mixture of sodium chloride, potassium chloride, magnesium and trace salts by spray drying.

In WO 93/18668 a production of a mixed salt by instant drying is described.

U.S. Pat. No. 7,621,968 describes a step-wise process for producing a low-sodium salt where a first amount of natural seawater is exposed to sunlight such that an amount of the water is evaporated and an amount of sodium chloride is crystallised. A second amount of seawater is added to the remaining brine and from this diluted brine, salt is crystallised having a sodium chloride content of no more than 70 wt %.

WO9318668 discloses a salt product comprising particles of NaCl, K/Mg-double salts and optionally KCl homogeneously distributed throughout each particle and having a molar ratio of K to Mg equal to or greater than one. This method is based on instantaneous drying of a salt slurry having the desired composition, using drum drying as the preferred method.

A problem with many low-sodium salt and raw sea salt products is a bitter taste, because of magnesium and calcium compounds.

Sea salt is in fact not a clear term in the art as it both refers to salt obtained by fully evaporating sea water, leaving as solid residue all the salts from sea water, and also sodium chloride salt obtained from sea water, but not including the other residual salts. The benefits of providing all salt components from seawater is that thus nutritionally beneficial minerals are provided including beneficial trace minerals. However, as mentioned, products obtained by full evaporation of sea water have an unpleasant taste, not readily interchangeable with table salt.

Further commercially useful methods would be much appreciated, for providing low-sodium salt with a nutritionally beneficial salt profile and good organoleptic properties.

SUMMARY OF INVENTION

The invention relates to the production of a salt with precipitation of a mixture of sodium chloride, potassium chloride and blend crystals (double salts) of potassium chloride and magnesium chloride (carnalite) and potassium chloride and magnesium sulphate (cainite). The invention provides a new process based on recirculation of brine from sea water and accumulation of trace minerals in a "mother liquor" to obtain substantially an equilibrium state where trace minerals from sea water are enclosed in the moisture in the salt.

The salt provided by the invention has the advantages of providing beneficial trace mineral components found in sea water but not having the metallic and bitter taste, often associated with low sodium salts.

Whereas conventional processes for precipitating salts from sea water are generally "linear" i.e. the brine is treated through several steps where different components of the brine are crystallised out so that different salts are obtained at different steps. In such a system sodium chloride would be separated at a brine density approx. 1.22-1.30 g/mL and a mixture of sodium chloride and potassium-magnesium double salts at density >1.3. Each step is different in brine composition from the others.

In contrast thereto, the process of the present invention is based on one-step crystallisation of all components in an evaporating-crystallisation system. By acquiring a saturated brine in mother liquor in regard to all main components in the system the composition of the crystalline material exiting the system is substantially the same composition as the brine entering the system. When the process is operating regularly (i.e. after any initial startup) there is no increase or decrease in composition in the mother liquor, where all components are either saturated or have reached a steady state concentration. The trace minerals will accompany the humidity of the crystalline material, and after acquiring a steady-state condition, in the same proportions as in the incoming brine. The composition of the incoming brine is however different from the mother liquour, as concentration builds up in the mother liquor. This means that components that are removed from the mother liquour are to be recycled back in order to keep the composition constant. The volume and temperature within the crystalliser should also be kept constant for the system to function optimally. To summarise the composition of the product can be guaranteed to be the same as the composition of the feed including all main salts and trace minerals. No purge is necessary from the system. The final concentration of the mother liquor is based on solubilities of different salts and on material balance of the trace minerals.

According to the invention, a process is set forth for preparing a salt product derived from sea salt, comprising trace minerals from sea water. As will be appreciated, the content (composition) of trace minerals in the salt product will preferably substantially reflect the composition of said trace minerals in sea water.

In certain preferred embodiments the salt product has a reduced sodium content as compared to regular table salt. In this context, "reduced sodium content" generally refers to a salt which is not pure or substantially pure sodium chloride. Preferably the reduced sodium content salt of the invention has less than about 70 wt % sodium chloride and more preferably less than about 65 wt %. Preferably, the salt product fulfils requirements set forth by European legislation and the USFDA for products with reduced content of sodium chloride.

The process generally includes the steps of providing a concentrated brine from seawater. The brine is concentrated by evaporation and in the process $CaSO_4$ (gypsum) is precipitated. By seeding with gypsum particles scaling in the equipment is prevented and the precipitated gypsum is removed in a particle separator. The brine is typically concentrated to a salt concentration in the range of about 5-35 wt % (or up to saturation concentration) such as in the range of about 15-20% dissolved salts. In some preferred embodiments, the concentrated brine is mixed with potassium chloride, either being provided as solid or as concentrated brine, and the mix is transferred to a crystalliser unit.

Liquid is evaporated from the crystalliser such that crystals form, in a continuous homogeneous process, the crystals are transferred from the crystalliser through a wash unit where they are rinsed such that the concentrated mother liquor that inevitably comes along with the crystals is rinsed off and this excess liquid is returned to the crystalliser with the rinsing liquid, the rinsing liquid being suitably a portion of the concentrated brine, which is transferred as a counter current through the wash unit. This ensures recycling of trace minerals that are not part of the salt product (in humidity or trapped as crystal water) and dissolved magnesium salts which cause bitter taste.

The rinsed crystals are further transferred to a separating unit, which can suitably be a centrifuge, cyclone or other functionally equivalent separating device. In the separating unit excess liquid is separated and transferred back to the crystalliser unit, and the salt crystals are removed from the separating unit and may be dryed to remove further water, obtaining crystals that preferably have no more than 2 wt % moisture.

The inventive process is characterised by recycling of the brine from which the salt crystallises, thus all main ingredients of the mixed input brine reach substantially saturation or a steady equilibrium concentration in the mother liquor in the crystalliser. These will then precipitate as crystals, as more of the respective substances get added to the mother liquor through inflow of mixed input brine. Importantly, none of the liquor is purged out of the system as in conventional salt crystallisers. The trace minerals will accumulate in the mother liquor to a steady state, where the concentration in the mother liquor times the outflow of mother liquor that accompanies the salt produced (as crystal water and moisture) equals the inflow of trace minerals in the feed. As washing of the produced salt is an important part of the process to avoid bitter taste from the mother liquor drying on the surface of the salt crystals, a part of the trace minerals will be washed back to the crystalliser, however, as all washing liquid (rinsing liquid) is retransferred to the crystalliser, material is not lost out of the system with the washing. Regulation of the washing factor (washing ratio) is applied to secure a substantially constant content of trace minerals.

The crystalliser can essentially be of any conventional type, including but not limited to an open air crystalliser, a forced circulation crystalliser, a falling film crystalliser, an induced circulation crystalliser, and a draft tube baffle crystalliser. The crystalliser can be a single unit crystalliser but can also in other embodiments comprise a double unit crystalliser, with an evaporator crystalliser combination, wherein through temperature and heating control, evaporation takes place in an evaporation unit and the mother liquor flows into the crystalliser unit which is kept at a lower temperature, to maintain crystallisation.

The invention can be used for production of any mixtures of salts in one step where simultaneous crystallisiation is required, in order to obtain crystall/co-crystall particles of substantially homogenous composition.

BRIEF DESCRIPTION OF FIGURES

FIG. 1 shows a schematic illustration of a system of the invention.

DETAILED DESCRIPTION

A preferred salt product produced with the invention is referred to herein as "life salt", which is a unique product produced by addition of potassium chloride to a brine solution which is obtained by evaporation of seawater. This brine comprises the feed for the process of the invention. The potassium chloride can be made e.g. by evaporation of geothermal brine and fractional crystallisation of potassium chloride from it. In other embodiments solid potassium chloride is obtained commercially. The content of the salt product can be suitably controlled so as to substantially supply all the main minerals needed to the human body, as seawater contains essentially all the same minerals that are present in human blood. The addition of potassium chloride is beneficial for making a low-sodium product, i.e. replacing part of the sodium content from the salt composition in the sea water, which is vital for minimizing the high sodium intake, a health concern in particular in western societies.

The salt products according to the present invention can be used as regular table salt and can replace salt in any conventional food products and nutritional products, such as in butter, cheese, processed meats, snacks, etc., as well as a water binding agent, ingredient in sport and health beverages, as excipient in medicaments, and more.

The formation of K/Mg double salts in the process of the invention is advantageous as the double salts have low hygroscopicity compared to single salts of magnesium and affect the taste of the obtained salt product.

In preferred embodiments, the salt produced with the invention contains at least 2 wt % potassium chloride but preferably at least about 10 wt % and more preferably at least about 20 wt % potassium chloride and yet more preferably at least about 25 wt % potassium chloride, such as at least about 30 wt %.

In other embodiments, the salt according to the invention has a mineral profile more resembling the salt profile of seawater, comprising in the range of about 2-4 wt % KCl, in the range of about 60-75 wt % NaCl, in addition to the other minerals found in sea water, magnesium (dominantly as magnesium chloride and magnesium sulfate), calcium, and further minor constituents.

In contrast to conventional salt crystalliser systems, there is no purge of brine at any stage, but rather the brine is recirculated, thereby increasing the concentration of more soluble salts and those minerals found in low concentration in the initial brine, in the crystalliser mother liquor, until essentially a steady state is reached.

The starting material in the process is concentrated brine, which is typically seawater which has been concentrated. Gypsum is removed from the source sea water typically by conventional seeding technique, which amounts to 3-4%, before final evaporation to obtain the concentrated brine.

The starting material brine is concentrated to a salt concentration preferably in the range of about 5-30 wt %, such as typically in the range of about 15-30 wt %, and more preferably in the range of about 25-30 wt %. The specific concentration of the brine at the start of the process may depend on specific conditions, what means are available for evaporation, etc. In the embodiments where a salt with substantial potassium content is desired, potassium chloride is mixed in with the brine, the potassium chloride is preferably added as a solid to the brine. The amount and concentration of potassium chloride added to the initial brine will depend on the desired final concentration of potassium chloride and desired ratio of potassium to sodium in the final product.

During an initial startup phase when a system and process of the invention is started, such as when starting a new system, or re-starting a system after emptying and cleaning, etc. the concentration of minor components and trace components builds up in the mother liquor in the crystalliser. These compounds cannot escape from the crystalliser but along with the formed crystals that are passed through the washing column to the separation unit. Some mother liquid will inevitably come along with the crystals into the washing column, generally on the order of about 65 wt % of the total mass flow.

However, by passing a rinsing liquid which can be at least a portion of the mixed brine through the wash unit as a washing counter current rinsing the crystals, the liquid that is passed along with the crystals to the separation unit is diluted, by how much depends on how much of the mixed brine is passed though the washing column, i.e. the dilution factor of the liquid which comes along with the crystals from the crystalliser. Thus, a substantial portion of the material in the mother liquid that initially enters the wash unit with the crystals is transferred back to the crystalliser. This reduces the concentration of minor minerals on the surface of the wet crystals, which will positively affect the organoleptic properties of the crystals and reduce a bitter taste of the obtained salt, which can result when excess mother liquor with high concentration of magnesium salts dries on the salt crystal surfaces. Generally, in the range of 1 to 100% of the concentrated brine is transferred through the wash unit to the crystalliser, such as in the range of 1-80% or in the range of 1-50%, and more preferably in the range of about 1-20%, such as in the range of about 2-20%, or more preferably in the range of about 2-10%, such as about 2%, about 5% or about 10%.

In other embodiments, water or a salt solution such as a sodium chloride solution, can be used as rinsing liquid, for washing the crystalls that are transferred from the crystalliser to the separating unit.

Note that the wash unit is not limited to washing columns as other washing/rinsing arrangements are possible as well, such as a conveyor tube or the like.

A "washing factor" (dilution factor) parameter is defined which is the ratio between volume of liquid passed through washing column as counter current washing liquid versus the volume of mother liquor that enters along with crystals into the washing column. The washing factor is controlled by controlling the flow rate and amount of brine fed through the washing column. The washing factor is generally in the range of about 0.5-50, such as in the range of 0.5-25 and more preferably in the range of about 0.5-10 such as in the range of 1-10, or more preferably in the range of 1-5, such as about 1, about 2.5 or suitably about 5.

The wet and rinsed crystals that exit the crystalliser through the washing column are passed to a separation unit which is preferably a centrifuge, such as a centrifuge of the pusher type. The separation unit preferably separates sufficient liquid from the salt crystals to provide the salt crystals to a dryness of at least in the range of about 90-98 wt %, i.e. containing no more than about 2-10 wt % moisture, such as in the range of 2-4 wt % moisture. The excess water which is separated from the crystals is returned to the crystalliser. The obtained crystals can be further dried if desired.

As the minor minerals will reach a much higher concentration in the mother liquor than in the mixed brine, some minerals will be comprised in the minor amount of liquid trapped within crystals (i.e. liquid that is not rinsed off from the crystals) as this liquid has the same high concentration of minor minerals as the mother liquor. Thus the salt product will contain all of the original minerals found in low concentration in the original brine. By rinsing the crystals in the wash unit, it is however ensured that too much of concentrated minor minerals will not be deposited on the salt crystal surfaces.

In another aspect, the invention sets forth a system for producing salt following the process of the invention, the system comprising as main components a mixing container (1) for mixing concentrated brine and potassium chloride, a washing column (2) connected to the mixing container (1) through a conduit (3), a crystalliser (4) connected to said washing column, and a separating unit (5), allowing crystals formed in the crystalliser to be fed through the washing column to said separating unit, the system further comprising a conduit for feeding liquid separated from salt crystals in said separating unit back to said crystalliser.

The crystalliser can be any of a suitable type of various types well known to the skilled person, including but not limited to an open air crystalliser, a forced circulation crystalliser, a falling film crystalliser, an induced circulation crystalliser, and a draft tube baffle crystalliser.

The conduit (3) feeding mixed brine from the mixing container includes a split, for directing at least a portion of the fed mixed brine through the washing column. In some embodiments, substantially all of the mixed brine being transferred is directed through the washing column, however in other useful embodiments, a portion of the transferred mixed brine is directed through the wash unit, such as in a range as mentioned above. The remaining portion of the transferred brine is transferred directly to the crystalliser without passing through the wash unit.

The system preferably comprises a control system with sensors and regulated switches for controlling one or more of the following parameters: the flow rate of mixed brine from the mixing container, the level of mother liquor in the crystalliser, the heat delivered to the crystalliser, and the ratio of mixed brine transferred through the washing column.

EXAMPLES

Example 1

"Life Salt" Containing 41% NaCl, 41% KCl, 1.9% Mg Besides Trace Minerals

1. A saturated mixture of NaCl, KCl and Mg-salts with density 1.25, containing 160 g/l NaCl (12.8%), 160 g/l KCl (12.8%) and 7.4 g/l Mg (0.6%) as a mixture of $MgCl_2$ and $MgSO_4$, is prepared by evaporation of seawater following addition of solid KCl to balance the concentration of NaCl. The ratio of main elements is: Na:K:Mg is 0.75:1:0.09.

2. Preparation of mother liqour: Saturated brine as described under step 1 is evaporated in an evaporator-crystalliser with constant addition of brine, keeping the volume constant. The precipitated salt is washed with incoming brine and removed constantly. No purge is taken from the system thereby securing the build-up of trace elements in the mother liquor.

3. The mixture prepared in step 1 is added to the mother liquor in a crystalliser containing a solution of $NaCl/KCl/MgCl_2/MgSO_4$ and trace minerals, saturated in regard to NaCl, KCl and Mg-salts. It contains 31.2 g/l NaCl, 29.8 g/l KCl and 92.3 g/l of Mg as a mixture of $MgCl_2$ and $MgSO_4$.

4. Salt crystals coming from the crystalliser are washed with a part of the brine (1) in a washing column. A washing factor is defined by the following ratio:

$$w = \frac{V_3}{V_1}$$

where $V_3$ is volume of brine used for washing the salt and $V_1$ is volume of mother liquor from crystalliser.

The concentration of trace minerals in the moisture content of the salt (y) is based on the following assumptions:

Trace minerals in the seawater brine (1) is 0.4% of the total minerals i.e. accounts to 0.004 kg/kg salt.

The outgoing salt contains the same amount of trace mineral in solution. If the salt contains 2% moisture the concentration of trace minerals in the moisture (x) will account to:

$$x = \frac{0,004}{0,02} = 0,2 \text{ kg/}l$$

The content of trace minerals in the mother liqour (x) will be a function of the concentration in the moisture and the washing factor.

This is shown in table 1 where the concentration of trace mineral in the salt moisture is shown as a function of water content (%) and the concentration in the mother liquor as a function of the washing factor.

TABLE 1

Concentration of trace minerals in crystal moisture (y) and mother liquor (x) as a function of washing factor

| % moisture in salt | y kg/l | Washing factor w | |
|---|---|---|---|
| | | w = 0 x kg/l | w = 1 x kg/l |
| 2 | 0.20 | 0.20 | 0.40 |
| 3 | 0.13 | 0.13 | 0.26 |
| 4 | 0.10 | 0.10 | 0.20 |
| 5 | 0.08 | 0.08 | 0.16 |

Example 2

"Sea Life Salt" Containing 67.7% NaCl, 1.9% KCl, 3.2% Mg and Trace Minerals

1. A saturated mixture of NaCl, KCl and Mg-salts with density 1.22, containing 235 g/l NaCl (19.2%) %), 10 g/l KCl (0.8%) and 10.4 g/l of Mg (0.8%) as a mixture of $MgCl_2$ and $MgSO_4$, is prepared by evaporation of seawater without addition of KCl. The ratio of main elements is: Na:K:Mg is 17.8:1.0:2.0.

2. The mixture is added to mother liqour in a crystalliser containing a solution of $NaCl/KCl/MgCl_2/MgSO_4$ and trace minerals saturated in regard to NaCl, KCl and Mg-salts. It contains 31.2 g/l NaCl, 29.8 g/l KCl and 92.3 g/l of Mg as a mixture of $MgCl_2$ and $MgSO_4$.

3. The washing of the salt crystals is performed in a washing column as described in example 1.

Ratio of Minerals in "Life Salt", from Example 1 and 2:

1st assumption: The basic material in life salt is seawater containing Na:K:Mg in the ratios 8.3:0.3:1 and trace minerals.

2nd assumption: Varying ratios of the basic materials is made by addition of KCl, resulting in decreased amounts of NaCl, Mg-salts and trace minerals in proportion to added KCl.

The ratios are shown in table 2:

TABLE 2

Range of percentage of minerals in life salt

| Substance | Max. NaCl ("sea life salt"; Example 2) | Min. NaCl ("life salt"; Example 1) |
|---|---|---|
| NaCl | 67.7 | 20 |
| KCl | 1.9 | 69.5 |
| Mg-salts | 28.4 | 8.4 |
| Mg | 3.2 | 0.9 |
| Trace minerals | 0.7 | 0.2 |

The invention claimed is:

1. A process for preparing a salt product derived from sea water, comprising trace minerals from sea water, comprising the steps of
   (a) providing a concentrated brine from sea water,
   (b) transferring the concentrated brine to a crystalliser unit,
   (c) building up and maintaining a mother liquor substantially saturated in main salt constituents, including sodium chloride, magnesium chloride, magnesium sulphate, potassium chloride and potassium sulphate,
   (d) evaporating liquid from said crystalliser such that crystals of different salts form into particles with substantially homogeneous composition including double salts,
   (e) transferring crystals from said crystalliser through a wash unit such that said crystals are rinsed off mother liquor on the crystal surfaces that leaves the crystalliser with the crystals, said rinsing performed with a rinsing liquid which is transferred after the rinsing to the crystalliser,
   (f) collecting said rinsed crystals and transferring them to separating unit where excess liquid is removed from the crystals, and optionally drying the crystals, and
   (g) feeding back separated excess liquid to the crystalliser, thereby obtaining a salt product comprising trace minerals.

2. The process of claim 1, wherein said concentrated brine from seawater is prepared by a process including a evaporation step to precipitate calcium sulphate, which is separated from the brine.

3. The process of claim 1 further comprising mixing potassium chloride with said concentrated brine from sea water prior to the transferring to said crystalliser.

4. The process of claim 1, wherein at least a portion of said concentrated brine is used as said rinsing liquid by transferring at least a portion of said concentrated brine to the crystalliser through said wash unit.

5. The process of claim 1, wherein said rinsing liquid is water or a salt solution, such as a sodium chloride solution.

6. The process of claim 4, wherein said wash unit is a washing column.

7. The process of claim 1, wherein the content of trace minerals in the salt product substantially reflects the concentration of said trace minerals in sea water.

8. The process of claim 1, wherein in the range of about 1 to 100% vol/vol of said concentrated brine is transferred through said wash unit to the crystalliser.

9. The process of claim 1, wherein said separating unit is a centrifuge.

10. The process of claim 1, wherein said concentrated brine comprises in the range of about 5-30 wt % salt concentration and preferably in the range of 15-30 wt % and more preferably in the range of 25-30 wt %.

11. The process of claim 1, wherein potassium chloride is mixed with said brine to obtain a mixed brine with a wt:wt ratio of K to Na in the range of about 1:27 to about 5:1.

12. The process of claim 11, wherein said salt product comprises in the range of 2-70 wt % KCl, and in the range of 20-68 wt % NaCl.

13. The process of claim 1, wherein after an initial phase where saturation steady state is reached in the crystalliser mother liquor, the mother liquor level is kept substantially constant by regulating inflow to the crystalliser and temperature in the crystalliser is kept substantially constant.

14. The process of claim 1, wherein brine is not purged during operation, but rather material only leaves the system as the salt product or soluble trace minerals obtained from the separation unit, and as vapors from the crystalliser.

15. The process of claim 3 where potassium chloride is extracted from geothermal brine.

16. The process of claim 1, wherein said crystalliser comprises two units, an evaporating unit and a crystallising unit, and wherein in step d), liquid evaporates from said evaporating unit and crystals form in said crystallising unit.

17. The process of claim 16, wherein said crystallising unit is kept at a lower temperature than said evaporating unit.

* * * * *

UNITED STATES PATENT AND TRADEMARK OFFICE
CERTIFICATE OF CORRECTION

| | | |
|---|---|---|
| PATENT NO. | : 8,979,948 B2 | Page 1 of 1 |
| APPLICATION NO. | : 13/805209 | |
| DATED | : March 17, 2015 | |
| INVENTOR(S) | : Egill Einarsson et al. | |

It is certified that error appears in the above-identified patent and that said Letters Patent is hereby corrected as shown below:

In the Claims:

Column 9, Line 19, Claim 11:
"The process of claim 1, wherein potassium chloride is" should read --The process of claim 3, wherein potassium chloride is--.

Signed and Sealed this
Eighth Day of March, 2016

Michelle K. Lee
*Director of the United States Patent and Trademark Office*